(12) United States Patent
Xu et al.

(10) Patent No.: US 7,963,092 B2
(45) Date of Patent: Jun. 21, 2011

(54) TRIMMER WITH CUTTING HEIGHT ADJUSTMENT

(75) Inventors: Haishen Xu, Nanjing (CN); Toshinari Yamaoka, Nanjing (CN)

(73) Assignee: Chervon Limited (HK)

( * ) Notice: Subject to any disclaimer, the term of this patent is extended or adjusted under 35 U.S.C. 154(b) by 0 days.

(21) Appl. No.: 12/848,520

(22) Filed: Aug. 2, 2010

(65) Prior Publication Data

US 2011/0030328 A1 Feb. 10, 2011

(30) Foreign Application Priority Data

Aug. 6, 2009 (CN) ...................... 2009 2 0234093 U

(51) Int. Cl.
*A01D 34/00* (2006.01)
(52) U.S. Cl. ....................................................... 56/12.7
(58) Field of Classification Search .................. 56/17.2, 56/15.8, 16.7, 16.9, 255, 12.7; 280/43.13; 30/271, 276; 172/17
See application file for complete search history.

(56) References Cited

U.S. PATENT DOCUMENTS

| | | | | | |
|---|---|---|---|---|---|
| 1,308,909 A * | 7/1919 | Landon | ........................... | 56/255 |
| 2,045,857 A * | 6/1936 | Hunter | ........................... | 56/249 |
| 2,263,368 A * | 11/1941 | Sejkora | ...................... | 280/43.13 |
| 2,529,870 A * | 11/1950 | Golasky | ........................ | 56/17.2 |
| 2,568,822 A * | 9/1951 | Pervis | ........................... | 56/17.2 |
| 2,608,043 A * | 8/1952 | Berdan | .......................... | 56/17.2 |
| 2,730,374 A * | 1/1956 | Rogers et al. | ............. | 280/43.13 |
| 2,848,859 A * | 8/1958 | Abel | ............................. | 56/17.2 |
| 3,093,947 A * | 6/1963 | Whitman | ....................... | 56/17.2 |
| 3,161,006 A * | 12/1964 | Willette et al. | ............... | 56/17.2 |
| 3,269,100 A * | 8/1966 | Smith | ........................... | 56/17.2 |
| 3,357,715 A * | 12/1967 | Plamper et al. | ............ | 280/43.13 |
| 3,544,127 A * | 12/1970 | Dobson | ...................... | 280/43.17 |
| 3,677,574 A * | 7/1972 | Cyr | ............................. | 280/43.13 |
| 4,077,191 A * | 3/1978 | Pittinger et al. | .............. | 56/12.7 |
| 4,531,350 A * | 7/1985 | Huthmacher | .................. | 56/17.5 |
| 4,703,613 A * | 11/1987 | Raymond | ..................... | 56/12.7 |
| 4,835,952 A * | 6/1989 | McLane | ......................... | 56/17.2 |
| 5,309,701 A * | 5/1994 | McGuerty | ..................... | 56/16.9 |
| 5,484,154 A * | 1/1996 | Ward | ........................... | 280/652 |
| 5,526,633 A * | 6/1996 | Strong et al. | ................. | 56/17.2 |
| 5,613,354 A * | 3/1997 | Foster | ........................... | 56/16.7 |
| 6,339,918 B1 * | 1/2002 | Thomas | ........................ | 56/17.2 |
| 6,854,250 B2 * | 2/2005 | Boyko | ......................... | 56/14.9 |
| 6,874,306 B2 * | 4/2005 | Hishida | ......................... | 56/12.7 |
| 7,036,297 B2 * | 5/2006 | Popp | ............................ | 56/12.7 |
| 7,117,660 B1 * | 10/2006 | Colens | ....................... | 56/10.2 A |
| 2008/0083206 A1 * | 4/2008 | Verduzco | ....................... | 56/255 |
| 2009/0260237 A1 * | 10/2009 | Alliss | ............................. | 30/276 |

* cited by examiner

*Primary Examiner* — Árpád Fábián-Kovács
(74) *Attorney, Agent, or Firm* — Greenberg Traurig, LLP

(57) ABSTRACT

A trimmer includes a working head having a housing and a handle that extends outwardly from a rear end of the housing, at least one wheel mounted on the rear end of the housing, a support element for supporting the working head that is located below the housing and mounted on the housing through a shaft, a cutting element coupled to the housing coaxial with the support element, and a cutting height adjustment device which is respectively connected with the at least one wheel and the shaft for adjusting a cutting height of the trimmer via movement of the at least one wheel and the shaft to which the support element is coupled relative to the cutting element. In this manner, no matter the cutting height, a cutting surface of the cutting element can be ensured to be substantially parallel to the ground.

9 Claims, 5 Drawing Sheets

TRIMMER WITH CUTTING HEIGHT ADJUSTMENT

RELATED APPLICATION INFORMATION

This application claims the benefit of CN 200920234093.9, filed on Aug. 6, 2009, the disclosure of which is incorporated herein by reference in its entirety.

BACKGROUND

The following generally relates to trimmers and, more particularly, relates to a hand-push type trimmer having a cutting height adjustment device.

Trimmers, which are usually used as common garden tools for trimming lawns, can be divided into two types, namely, a hand-held type and a hand-push type. With respect to hand-push type trimmers, such trimmers typically include a working head and a handle mounted on the rear end of the working head. The working head includes a housing, two rear wheels mounted on the rear end of the housing, and a support element. The support element is positioned below the housing and in front of the rear wheels, contacts with the ground to support the whole working head together with the rear wheels, and is mounted on the housing by a shaft. A blade is further rotatably mounted on the shaft via a blade-shaft. A motor provided in the housing drives the blade-shaft to rotate via a transmission device. In this manner, the blade mounted on the blade-shaft can be rotated together with the blade-shaft so as to cut the grass.

To adjust the cutting height of the trimmers, currently known trimmers also include an adjustment device. Specifically, the adjustment device is used to change the distance between the blade and the ground by adjusting the vertical distance between the support element and the blade. When the vertical distance between the blade and the support element is larger, the distance between the blade and the ground is also larger, and therefore the cutting height is larger. Otherwise, when the distance between the blade and the ground is smaller, the cutting height is also smaller.

This existing adjustment device does, however, suffer a disadvantage in that use of the existing adjustment device may not result in the cutting surface of the blade being positioned substantially parallel to the ground. By way of example, when the cutting height is adjusted to a lower level, that is the blade is moved closer to the ground, the height of the front portion of the working head supported by the support element is reduced, while the rear portion of the working head supported on the rear wheel remains in the initial position and is located at a higher position. Therefore, the whole working head is in a state of tilting forwardly, which causes the cutting surface of the blade to be no longer parallel to the ground. In this state, a flat lawn can not be obtained.

SUMMARY

The following describes an improved trimmer having height adjustment such that, no matter the set of the cutting height, the cutting surface of the cutting element will be substantially parallel to the ground. To this end, the described trimmer includes a working head and a handle extending out from the rear end of the working head. The working head includes a housing, at least one wheel mounted on the rear end of the housing, and a support element for supporting the working head. The support element is positioned below the housing and is mounted on the housing through a shaft. A cutting element is also provided so as to be coaxial with the support element. The working head also includes a cutting height adjustment device which is respectively connected with the wheels and the shaft where the support element is located. As a result of this arrangement, when the cutting height is adjusted, for example to a lower level, not only the vertical position of the front portion of the working head is reduced, but also the rear portion of the working head is simultaneously reduced, and the both reduced heights are substantially same. Therefore, the cutting surface of the cutting element can always remain generally parallel to the ground so that a flat lawn can be obtained.

BRIEF DESCRIPTION OF THE DRAWINGS

The subject trimmer having height adjustment will be further described with reference to the accompanying drawings, in which.

DETAILED DESCRIPTION

Figure 1:
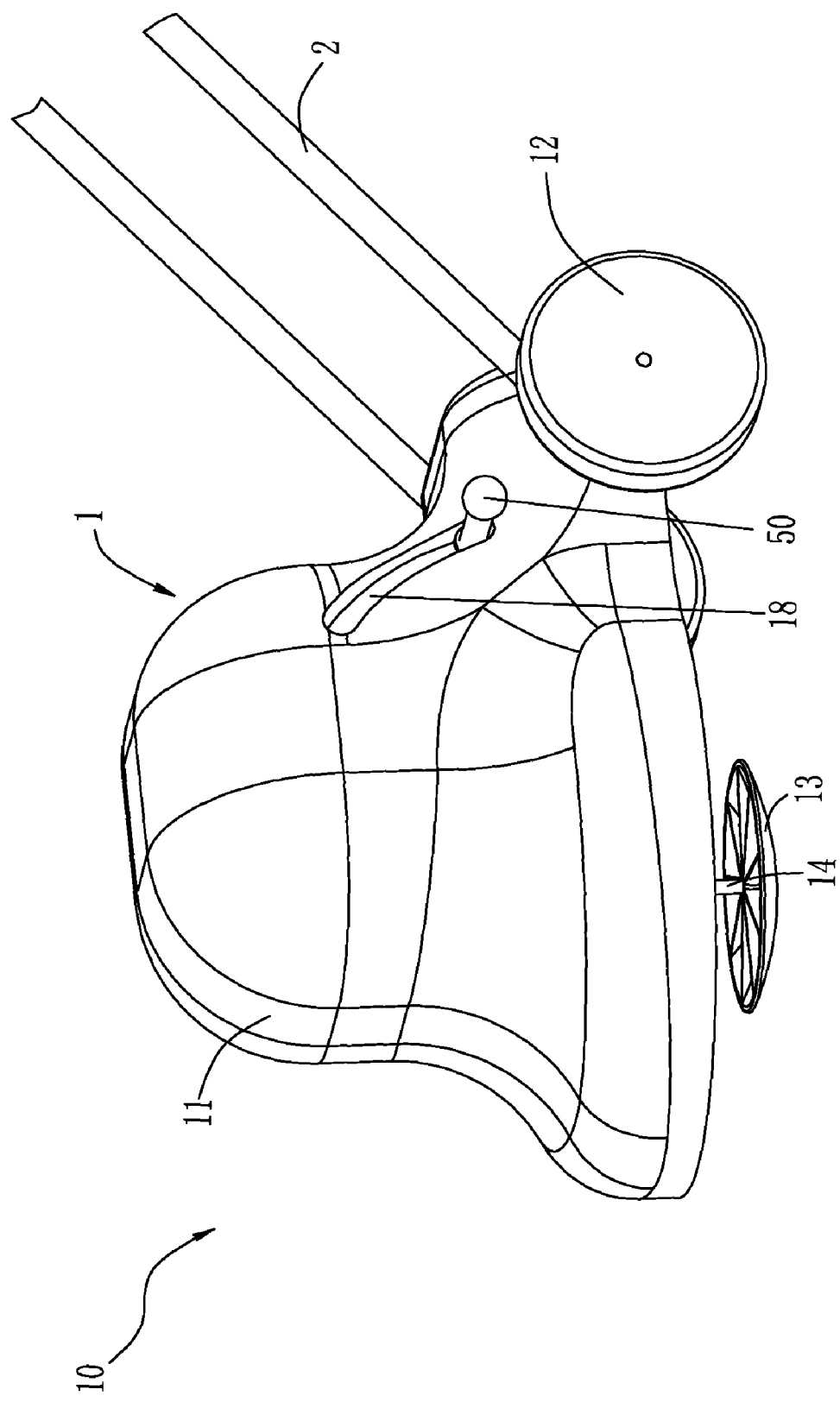
FIG. 1 is a perspective view of an exemplary embodiment of a trimmer constructed according to the description that follows.

As shown in FIG. 1, a hand-push type trimmer 10 includes a working head 1 and a handle 2. The handle 2 extends out from the rear end of the working head 1 obliquely and upwardly and terminates in a grip portion that is not shown. The working head 1 includes a housing 11, a pair of wheels 12, and a support element 13, wherein the wheels 12 are located on the rear end of the housing 11 and wherein the support element 13 is located below the housing 11 and in front of the wheels 12. The support element 13 and the pair of wheels 12 thus form three supporting points for supporting the weight of the entire working head 1. In other embodiment, the wheels positioned on the rear end of the housing 11 can also be one wheel, such as a long-shaped roller.

Figure 2:
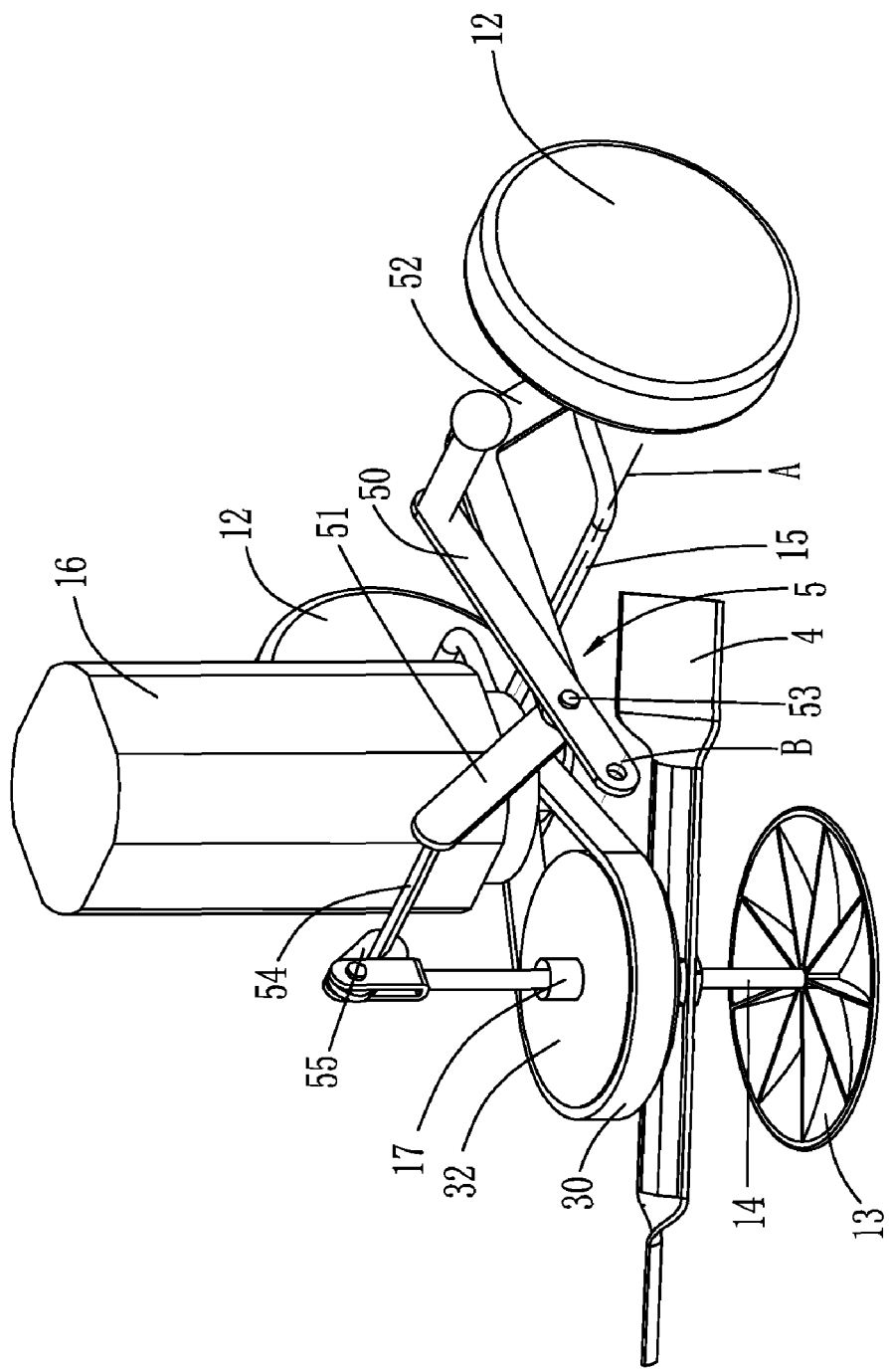
FIG. 2 is a perspective view of an exemplary cutting height adjustment device of the trimmer of FIG. 1.
Figure 3:
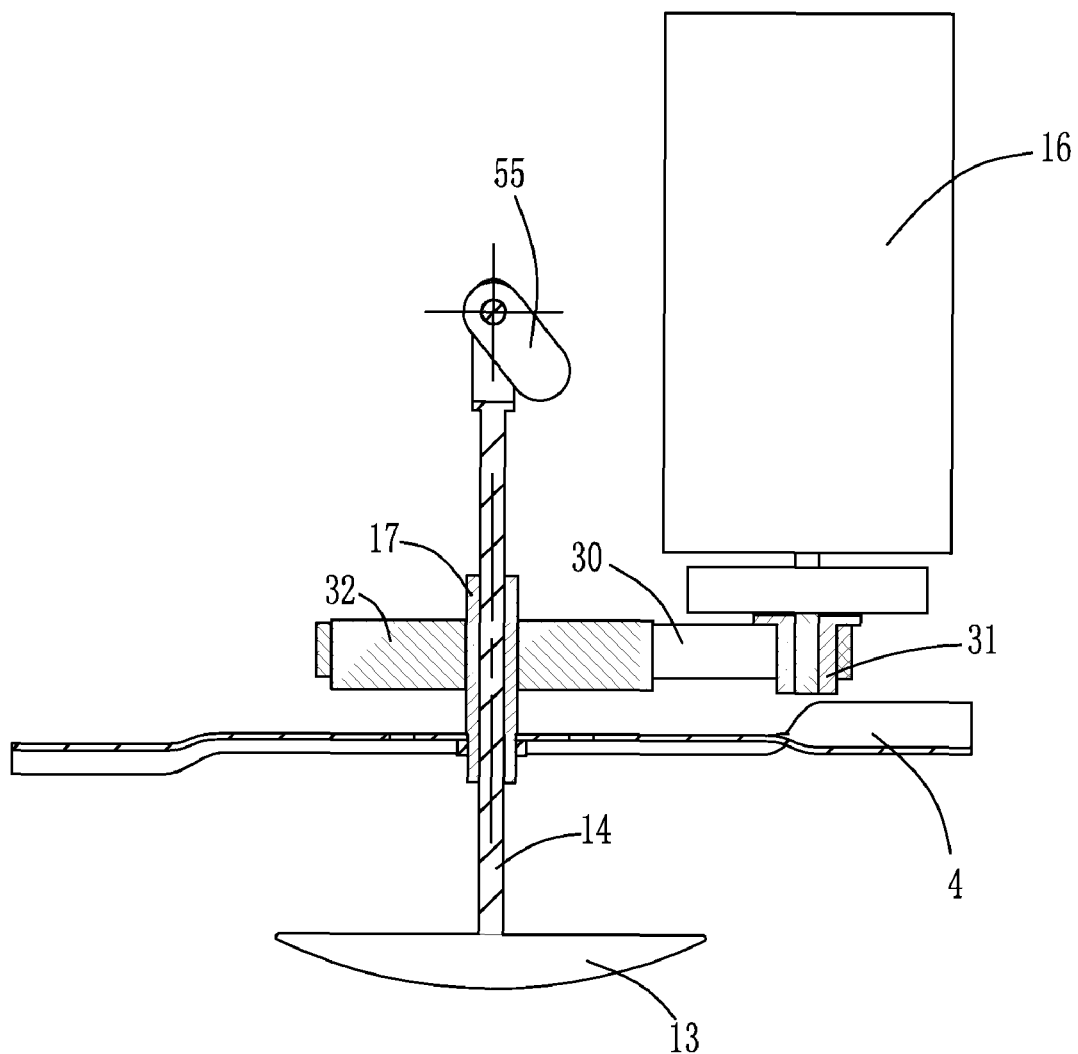
FIG. 3 is a sectional view of the height adjustment device shown in FIG. 2.

As shown in FIG. 2, the support element 13 is fixed to the lower end of a shaft 14 and mounted on the housing 11 via the shaft 14. The pair of wheels 12 are respectively installed on both ends of a bracket 15 and respectively mounted on two sides of the rear end of the housing 11 via the bracket 15. The bracket 15 has an axis A about which the wheels 12 and the bracket 15 can rotate. As shown in FIGS. 2 and 3, a motor 16 is installed in the housing 11 and drives a cutting element 4 through a belt transmission device. In this embodiment, the cutting element is a blade. However, in other embodiments, the cutting element may also be nylon rope. The belt transmission device includes a belt 30, a small pulley 31, and a large pulley 32, wherein the small pulley 31 is installed on the output shaft of the motor and wherein the large pulley 32 is fixed and mounted on a hollow shaft 17. The hollow shaft 17 is rotatablely fixed and encircles the shaft 14, and both shafts are coaxial with each other. Shaft 14 can be moved axially relative to the hollow shaft 17. The blade 4 is also installed on the hollow shaft 17, so that the blade 4 can rotate together with the hollow shaft 17 to cut the grass when the motor 16 drives the hollow shaft 17 to rotate via the belt transmission device.

In other embodiments, the belt transmission device can also be replaced by other transmission devices, such as gear transmission device.

The working head 1 also includes a cutting height adjustment device 5 which is illustrated as having a linkage mechanism comprising a grip 50, a first connecting rod 51, and a second connecting rod 52. As shown in FIG. 1, the grip 50 extends out from a slot 18 on one side of the housing 11 for gripping and adjusting during operation. As shown in FIG. 2, the grip 50 is connected on one end thereof within the housing 11 by a connecting element such as a pin (not shown) and can pivot about an axis B. The first and second connecting rods 51, 52 can be pivotally connected to the grip 50 by a hinge pin 53, and the grip 50 can be respectively connected with the support element 13 and the pair of wheels 12 through the first and second connecting rods 51, 52. Specifically, the first connecting rod 51 is pivotably connected to the upper end of the shaft 14 by a connecting stick 54 and a connecting sheet 55, and the second connecting rod 52 can be connected on one end thereof to the bracket 15 at the wheel. The first connecting rod 51 is fixed and connected with the connecting stick 54 and the connecting sheet 55. When the grip 50 pivots about the axis B, the first and second connecting rods 51, 52 are also moved accordingly and together therewith. At this time, the first connecting rod 51 drives the shaft 14 and the support element 13 to be axially moved relative to the hollow shaft 17 by the connecting stick 54 and the connecting sheet 55, and thus the distance from the blade 4 and the front portion of the working head 1 to the ground is changed to achieve the adjustment for the cutting height. The second connecting rod 52 drives the bracket 15 connected with it and the two wheels 12 to rotate about the axis A, so that the height between the rear portion of the working head 1 and the ground is changed. Preferably, the axial displacement of the support element 13 is designed to be substantially same as the vertical displacement of the wheel 12, that is, the axial displacement of the front portion of the working head 1 and that of the rear portion are substantially same, so that the cutting surface of the blade 4 can be ensured to be parallel to the ground.

Figure 4:
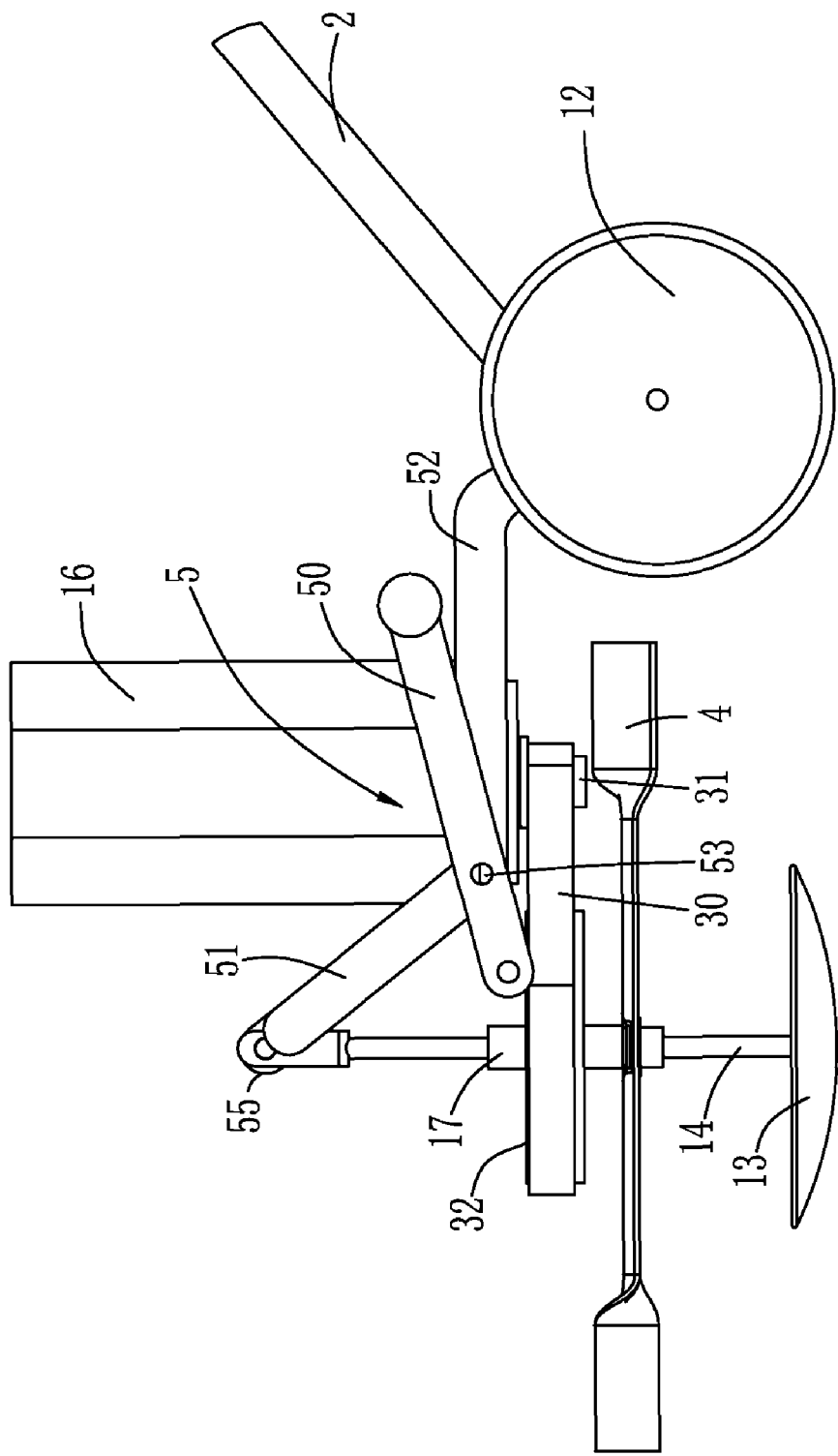
FIG. 4 is a side view showing the height adjustment device of FIG. 2 in a state of maximum cutting height.
Figure 5:
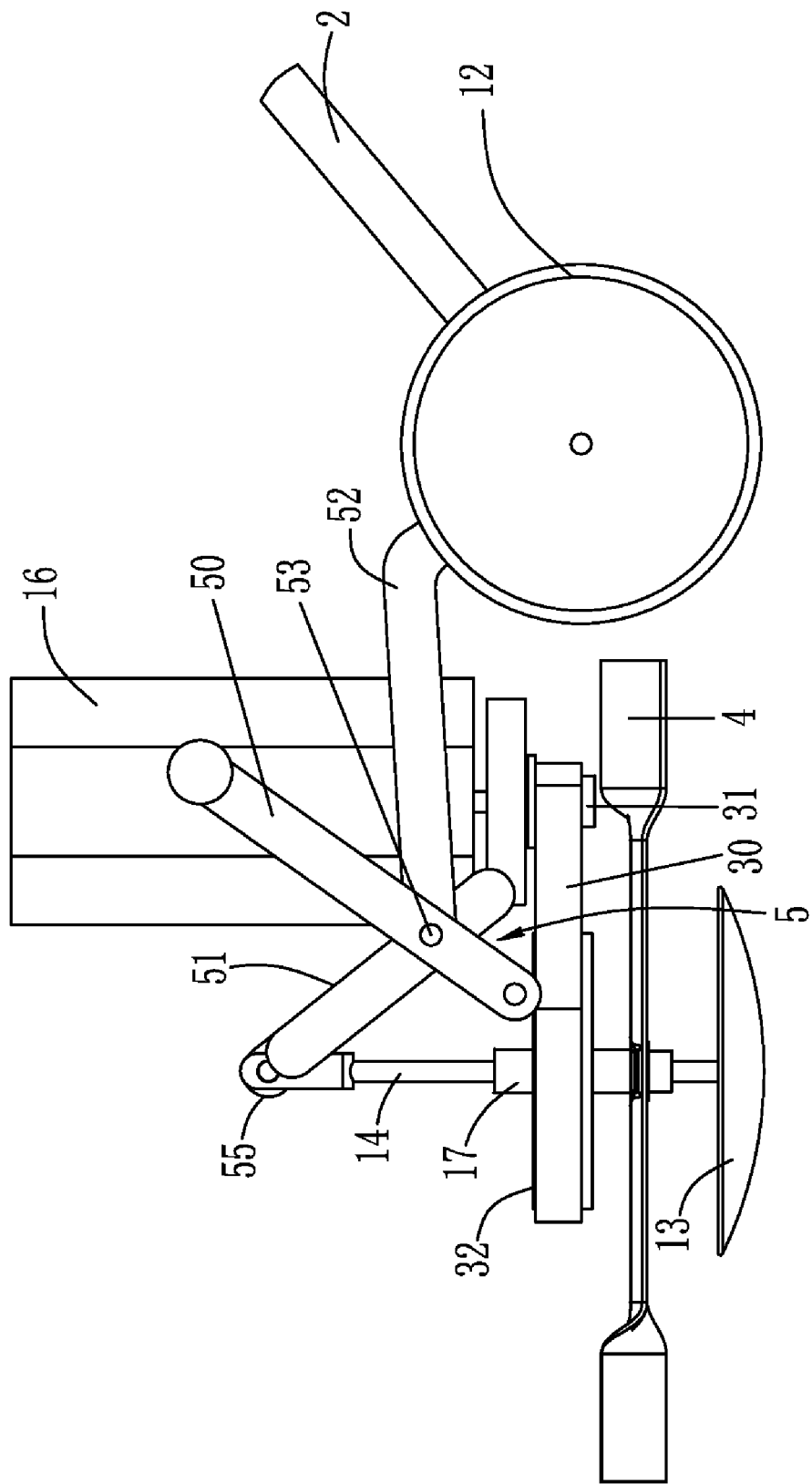
FIG. 5 is a side view showing the height adjustment device of FIG. 2 is a state of minimum cutting height.

FIGS. 1 and 4 illustrate the blade 4 being positioned in a state corresponding to the highest cutting position in which the grip 50 is located on the lower end of the slot 18 on the housing 11. When the cutting height of the blade 4 is desired to be adjusted to a lower level, the grip 50 may be moved upwardly along the slot 18 whereupon the grip 50 pivots about the axis B counter-clockwisely, so that the first connecting rod 51 connected with the grip 50 drives the support element 13 and shaft 14 to be moved upwardly in the vertical direction relative to the hollow shaft 17 via the connecting stick 54 and the connecting sheet 55, thereby reducing the distance between the blade 4 and the ground. At the same time, the second connecting rod 52 connected with the grip 50 drives the bracket 15 and the wheels 12 to pivot about the axis A, thereby reducing the distance between the rear end of the working head 1 and the ground. The reduced distances of the front portion and the rear end of the working head 1 in the vertical direction are substantially equal to each other, as shown for example in FIG. 5. Therefore, while the cutting height of the blade is reduced, the distance between the entire working head 1 and the ground is also reduced accordingly so that the cutting surface of the blade can be ensured to be parallel to the ground.

The improved trimmer is not intended to be limited to the components or arrangements described above or as shown in the figures. Rather, any obvious modifications, substitutions, or changes to the components and their arrangements based on the spirit of the described and illustrated embodiment are to be regarded as falling within the scope of the invention hereinafter claimed.

What is claimed is:

1. A trimmer, comprising:
   a working head having a housing and a handle that extends outwardly from a rear end of the housing;
   at least one wheel mounted on the rear end of the housing for contacting the ground;
   a support element for contacting the ground and for supporting the working head above the ground in cooperation with the at least one wheel, the support element being located below the housing and mounted on the housing through a shaft;
   a cutting element coupled to the housing coaxial with the support clement; and
   a cutting height adjustment device which is respectively connected with the at least one wheel and the shaft for adjusting a cutting height of the trimmer via movement of the at least one wheel and the shaft to which the support clement is coupled relative to the cutting element.

2. The trimmer as recited in claim 1, wherein a cutting surface of the cutting element is parallel to the ground when the cutting height adjustment device is used to place the trimmer at a lowest cutting height.

3. The trimmer as recited in claim 1, wherein the support clement is located in front of the at least one wheel.

4. The trimmer as recited in claim 1, wherein the cutting height adjustment device comprises a linkage mechanism coupled to the shaft and the at least one wheel.

5. The trimmer as recited in claim 1, wherein the cutting height adjustment device comprises a grip, a first connecting rod connected to the shaft, and a second connecting rod connected to the wheel.

6. The trimmer as recited in claim 5, wherein the grip is pivotably mounted on the housing and the first and second connecting rods are connected to the grip in a pivotable manner.

7. The trimmer as recited in claim 6, wherein the housing has a slot formed in one side thereof from which the grip extends outwardly.

8. The trimmer as recited in claim 7, wherein the cutting element is mounted on the shaft via a hollow shaft and the shaft can be moved in a vertical direction relative to the hollow shaft and the cutting element.

9. The trimmer as recited in claim 1, wherein the cutting element is disposed intermediate the support element and the working head.

* * * * *